United States Patent [19]

Barteau et al.

[11] 3,975,070

[45] Aug. 17, 1976

[54] FLOUR AND BATTER APPARATUS

[75] Inventors: John F. Barteau, Boerne; George J. King; August M. Saenz, both of San Antonio, all of Tex.

[73] Assignee: Church's Fried Chicken, Inc., San Antonio, Tex.

[22] Filed: Apr. 10, 1975

[21] Appl. No.: 566,913

[52] U.S. Cl. .............................. 312/322; 312/210.5; 312/319; 99/336
[51] Int. Cl.² .................... A47B 88/00; A47J 29/02
[58] Field of Search ........ 312/319, 320, 322, 210.5, 312/133; 134/135; 99/414, 443, 336, 409

[56] References Cited
UNITED STATES PATENTS

| | | | |
|---|---|---|---|
| 549,756 | 11/1895 | Van Horn et al. | 134/135 |
| 1,576,321 | 3/1926 | Gasser | 99/409 |
| 1,598,335 | 8/1926 | Alexander | 312/319 |
| 2,506,919 | 5/1950 | Frank | 312/319 |
| 2,550,758 | 5/1951 | Bemis | 99/414 |
| 2,575,441 | 11/1951 | Burnett | 312/319 |
| 2,707,428 | 5/1955 | Netreba | 99/336 |
| 2,915,000 | 12/1959 | Hetzel et al. | 99/336 |
| 3,078,786 | 2/1963 | Arvan | 99/336 |
| 3,501,316 | 3/1970 | Guthrie, Sr. | 99/336 |
| 3,597,035 | 8/1971 | Church, Jr. | 312/210.5 |

FOREIGN PATENTS OR APPLICATIONS 64,150    10/1955    France ............................ 99/414

*Primary Examiner*—Paul R. Gilliam
*Assistant Examiner*—Victor N. Sakran
*Attorney, Agent, or Firm*—Cox, Smith, Smith, Hale & Guenther Incorporated

[57] ABSTRACT

Apparatus is for economically and efficiently preparing foods for frying by a fast service food store. Food, such as chicken cut in pieces for frying, is placed inside of a basket portion of the apparatus and then lowered into a batter solution by pushing downward on the basket crossbar. Upon releasing the crossbar, springs push the basket upward. Thereafter, the batter coated food may be dumped from the basket by pivoting the basket portion forward.

6 Claims, 3 Drawing Figures

FLOUR AND BATTER APPARATUS

BACKGROUND OF THE INVENTION

The present invention relates to an apparatus for use in a fast service food store, and, more particularly, to a flour and batter apparatus to be used in the preparation of foods for frying.

The present invention has been specifically designed and built for use in conjunction with U.S. Pat. No. 3,597,035, issued on Aug. 3, 1971 and assigned to the same assignee as the present invention, said U.S. Pat. No. 3,597,035 being incorporated by reference for all purposes.

BRIEF DESCRIPTION OF THE PRIOR ART

In the past, the most common method for coating foods with a batter in preparation for frying was to take the piece of food, such as chicken, in the hand and dip it in the batter and, subsequently, remove from the batter and place in the flour and roll unitl it is fully coated. As this process is repeated numerous times, flour and batter will tend to collect on one's hands until it is removed. After a short period of time the individual would have to wipe or clean his hands, resulting in the loss of batter and flour, not to mention the lack of sanitation by using one's hands to handle the food. By use of the present apparatus, a substantial portion of the waste has been eliminated, as will be described in more detail subsequently.

In the prior art, there are different types of screens and baskets commonly used for the dipping of foodstuffs, such as chocolate coated candy, in a liquid solution for forming an outer coating thereon. While these various patents may show a feature here or a feature there of the present invention, none of these prior patents show the total combination and concept as shown with the present apparatus.

Included in the prior art are various patents drawn to baskets for use in the cooking of French fried and/or shoestring potatoes, as is specifically shown in U.S. Pat. No. 2,550,758. However, neither this patent nor any of its counterparts show the total concept of battering foods in preparation for frying as does the present invention.

SUMMARY OF THE INVENTION

The flour and batter apparatus as described in the present invention is designed for use in conjunction with a flour and batter table as basically shown in the incorporated reference and pictorially represented in phantom lines of the drawings of the present invention. The flour and batter apparatus consists basically of a basket attached to an upper frame that mounts on the upper rim of a pan which can contain the batter solution. The basket can be pushed downward toward the lower base to dip the basket and its contents into the batter solution with the basket being returned to its uppermost position upon release thereof. Next, the basket can be pivoted forward, dumping its contents into a pan of flour for the subsequent step of flouring the food in preparation for frying. If additional flour and batter is necessary, the process can be repeated.

To insure that the basket slides smoothly into and out of the batter, it is essential that the upper and lower spacing of slide posts be identical on the upper frame and the base place. The posts are also sloped forward so that a normal downward push from the front would be acting parallel with the post.

DESCRIPTION OF THE PREFERRED EMBODIMENT

Figure 1:
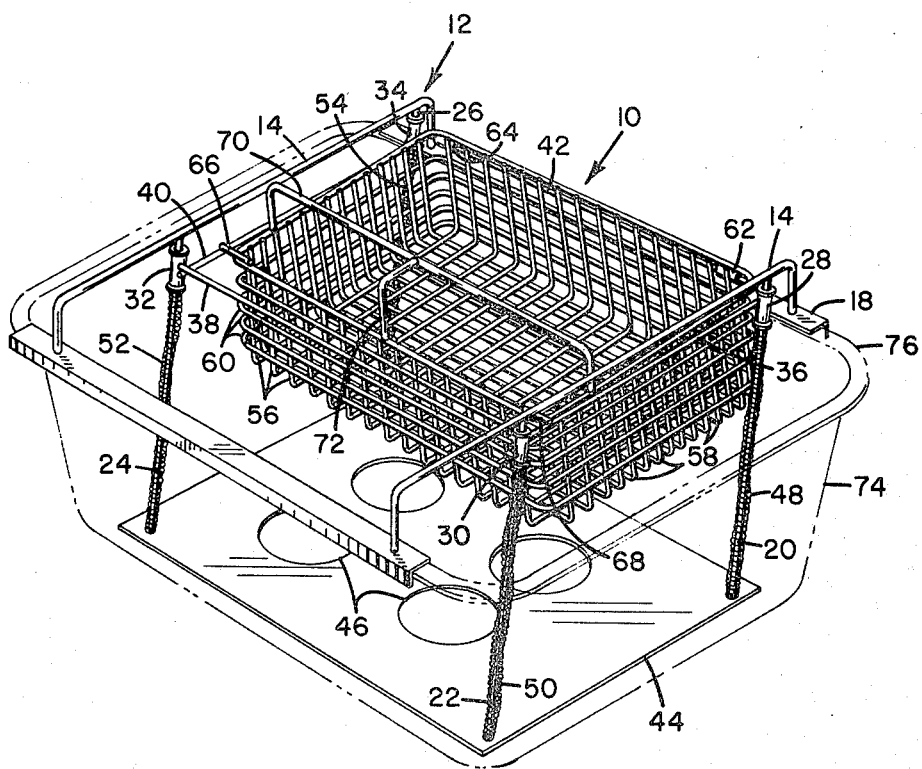
FIG. 1 is a pictorial representation of the present invention mounted in the batter pan.

Referring now to FIG. 1 of the drawings, there is shown a basket represented generally by the reference numeral 10. The basket 10 is held in place by a upper frame 12 that consists of upper support rods 14 that extend from the front to the back of the basket 10. The upper support rods 14 turn downward on each end and attach to angles bars 16 and 18.

Though any particular method of attachment may be used and any type of material may be used, for the purposes of this preferred embodiment all attachments unless otherwise specified in this application are by means of welding and all material used unless otherwise specified is formed from stainless steel. The reason for using stainless steel as the material for producing the present apparatus is for health and sanitation reasons; however, it should be realized that other types of strong, non-corrosive, heat-resistant substances may also be used.

In the construction of the upper frame 12, it is very important that all parts be properly located to insure proper movement of the present apparatus. Therefore, the upper support rods 14 must be equally spaced on angles bars 16 and 18, respectively, in such manner as to form a rectangle. Extending generally downward and slightly rearward from the upper support rods 14 are the support legs 20, 22, 24 and 26. It should be realized there is equal spacing between support rods 20 and 22 as is between support rods 24 and 26 so that the support legs should always be the corners of a rectangle encircling basket 10. On each of the support legs 20, 22, 24 and 26 are located spool sleeves 28, 30, 32 and 34, respectively. The spool sleeves 28, 30, 32 and 34 have an internal opening large enough to freely slide along their respective support legs 20, 22, 24 and 26. Attached to the spools are frame rods with frame rod 36 extending from spool sleeve 28 to spool sleeve 30, frame rod 38 extending from spool sleeve 30 to spool sleeve 32, frame rod 40 extending from spool sleeve 32 to spool sleeve 34, and frame rod 42 extending from spool sleeve 34 to spool sleeve 28.

The lower part of the support legs 20, 22, 24 and 26 are attached to a base plate 44. The spacing between the support legs 20, 22, 24 and 26 should be maintained from the upper support rod 14 to the base plate 44. The purpose of the slight rearward slope of the support legs 20, 22, 24 and 26 will be explained in more detail subsequently. Base plate 44 has several large holes 46 cut therein to allow free flow of the batter solution therethrough.

Before the attachment of the support legs 20, 22, 24 and 26 to the base plate 44, coil springs 48, 50, 52 and 54 are placed on each respective support leg. These coil springs are fairly resilient, thereby allowing a large amount of downward movement of the spool sleeves 28, 30, 32 and 34 when compressing the springs; however, the coil springs 48, 50, 52 and 54 always tend to shove the respective spool sleeves 28, 30, 32 and 34 upward.

The basket 10 is made from a very simple, rugged construction, having long basket rods 56 that extend generally parallel to the front of basket 10 with substantially perpendicular upward bends on each end thereof. Short basket rods 58 extend parallel from the front of basket 10 with a generally perpendicular upward bend on each end thereof. A series of encircling rods 60 enclose the upward bends of long basket rods 56 and short basket rods 58 to form a generally rectangular basket. The encircling rods 60 are basically formed in a rectangle and attach to each upward bent portion of the long basket rods 56 and short basket rods 58. In the bottom of basket 10 where each long basket rod 56 and each short basket rod 58 overlap at which point they are also connected together.

In the front of basket 10 on frame rod 42 are located sleeves 62 and 64. The sleeves 62 and 64 are large enough to freely move on frame rod 42 with one of the sleeves being located at each end of frame rod 42. The sleeves 62 and 64 are attached to basket 10 by means of welding to the uppermost encircling rod 60. The basket 10 will freely pivot around frame rod 42. On the rear of basket 10, again attached to the uppermost encircling rod 60, are stops 66 and 68. Since the basket 10 is constructed to fit inside of frame rods 36, 38, 40 and 42, the stops 66 and 68 extend outward just enough to rest on frame rods 40 and 36, respectively. Notice that the frame rods 36 and 40 are connected on the inside of the spool sleeves 28, 30, 32 and 34. This allows sufficient clearance between stops 66 and 68 and upper support rods 14 when pivoting basket 10 upward and forward as shown in more detail in FIG. 3. Extending across the upper rear portion of basket 10 is a cross-rod 70 that has a downwardly extending portion attached to the upper encircling rod 60. To give additional support for the center of cross-rod 70 an angle brace rod 72 is connected between the midpoint thereof and the rear center portion of the uppermost encircling rod 60.

The entire apparatus as previously described is built to fit a specific size pan 74 which is shown in phantom lines in the drawings. The pan 74 has an upper rim 76 on which angles bars 16 and 18 rest. It should be understood that the downward portion of angles bars 16 and 18 are designed to fit over the outer edge of the upper rim 76 in the manner shown in FIG. 1, thereby securing the apparatus in a relatively rigid position.

Figure 2:
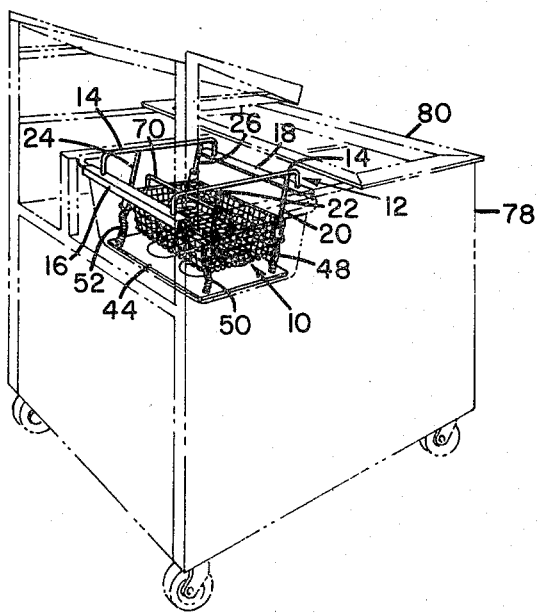
FIG. 2 is a pictorial representation of the present invention pushed downward into the batter pan with the entire apparatus being mounted in a specially designed flour and batter table.
Figure 3:
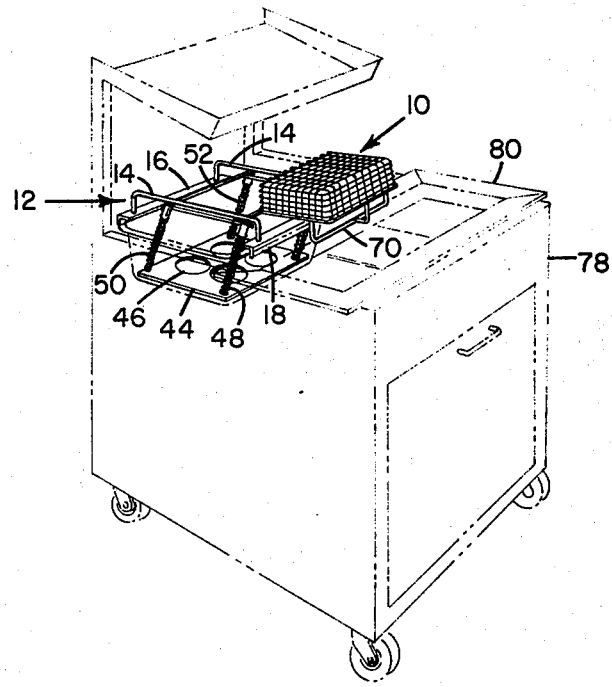
FIG. 3 is a pictorial representation of the present invention being pivoted forward so that the contents thereof can drop into a flour pan of the specially designed flour and batter table.

Upon filling the pan 74 with a batter solution suitable for the preparation of food such as chicken for frying, the apparatus and pan 74 are then placed in the opening of a flour and batter table 78 as shown in FIGS. 2 and 3 and described in more detail in the incorporated reference patent. Assuming the food that is to be floured and battered before frying is pieces of chicken, the pieces are placed inside of basket 10. The basket 10 is then pushed downward into the batter solution by pushing downward on cross-rod 70. Because the operator of the apparatus will be standing in front of the flour and batter table 78 the slope of the support legs 20, 22, 24 and 26 is sufficient to make the approximate direction of push on cross-rod 70 parallel to the axis of support legs 20, 22, 24 and 26. The coil springs 48, 50, 52 and 54 collapse under the downward force of the individual thereby allowing the basket to move to the position shown in FIG. 2. Upon release of the basket, the springs 48, 50, 52 and 54 raise the basket 10 with its pieces of chicken to its uppermost position. Next, by pivoting the basket 10 forward as shown in FIG. 3, the pieces of chicken are dumped into a tray 80 of flour and batter table 78 with the tray 80 containing flour to further coat the pieces of chicken in preparation for frying. Next the basket 10 is pivoted back to its normal position as shown in FIG. 1, and the process may be repeated.

Notice that the entire flour and batter apparatus in conjunction with the pan 74 and flour and batter table 78 are very interrelated with the sizes being critically determined so that pan 74 fits in a particular space of the flour and batter table 78. The flour and batter apparatus with its basket 10 is designed and constructed of a particular size so that it may operate in conjunction with the flour and batter table 78. The basket 10 has to clear an overhanging area of the flour and batter table 78 prior to dumping its contents into the flouring pan 80.

While all connections for the present invention have been described as welds unless there is some type of movable connection as described, it should be realized that other types of connections are possible. Soldering or brazing are equally acceptable; however, it should be realized that sanitation is a major consideration with the flour and batter apparatus. Because of the requirements placed on restaurants and fast service food stores by the federal and state governments, it is essential that the maximum cleanliness and sanitation be used for all devices that may touch the food during preparation. Therefore, the stainless steel and weld connections were determined by the applicant to be the most sanitary, easiest to clean, and economical to build.

We claim:

1. An apparatus for coating food with a batter contained in a pan in preparation for frying, said apparatus comprising:

stationary upper support means mounting on said pan containing the batter;

leg means attached to and extending generally downward from stationary upper support means;

vertically movable frame means slidably carried on said leg means;

basket means pivotally connected to and carried by said vertically movable frame means, said basket means being adapted to pivot relative to said frame means when in an upward position, said basket means having a stop means to prevent pivotal movement beyond a predetermined point, said basket allowing free flow of batter therethrough; and spring means connected to said vertically movable frame means urging said vertically movable frame means and basket means upward from the batter and normally holding said basket means near an uppermost position.

2. The apparatus as recited in claim 1 wherein said apparatus includes a base means to which said leg means are attached, said spring means surrounding said leg means and pushing against said base means.

3. The apparatus as recited in claim 2 wherein said stationary upper support means includes angle pieces for overlapping the upper edge of the pan.

4. The apparatus as recited in claim 3 wherein said basket means includes an upper cross rod connected thereto for pushing said basket downward into the batter.

5. The apparatus as recited in claim 4 wherein said vertically movable frame means includes first sleeve means on each of said leg means for said slidable movement thereon.

6. The apparatus as recited in claim 5 wherein said vertically movable frame means includes second sleeve means on the front thereof, said second sleeve means attaching to said basket means for allowing said pivotal movement over the front of said vertically movable frame means.

* * * * *